United States Patent [19]

Lange et al.

[11] Patent Number: 5,367,699
[45] Date of Patent: Nov. 22, 1994

[54] CENTRAL PROCESSING UNIT INCORPORATION SELECTABLE, PRECISA RATIO, SPEED OF EXECUTION DERATING

[75] Inventors: Ronald E. Lange; Russell W. Guenthner, both of Glendale; Leonard Rabins, Scottsdale, all of Ariz.

[73] Assignee: Bull HN Information Systems Inc., Technology Park, Mass.

[21] Appl. No.: 800,343

[22] Filed: Nov. 26, 1991

[51] Int. Cl.$^5$ .............................................. G06F 7/62
[52] U.S. Cl. .................................. 395/800; 395/550; 364/DIG. 1; 364/166; 364/179; 364/239.1; 364/251.3
[58] Field of Search ................ 395/375, 500, 550, 800; 364/137; 367/770, 166, 179

[56] References Cited

U.S. PATENT DOCUMENTS

| | | | |
|---|---|---|---|
| 3,766,461 | 10/1973 | Leenhouts | 318/630 |
| 3,806,918 | 4/1974 | Cauthron et al. | 178/68 |
| 3,883,870 | 6/1975 | Kunz | 343/17.7 |
| 4,198,605 | 4/1980 | Yamashita et al. | 455/161 |
| 4,249,448 | 2/1981 | Deutsch et al. | 84/1.01 |
| 4,298,989 | 11/1981 | Someno et al. | 455/183 |
| 4,413,908 | 11/1983 | Abrams et al. | 356/346 |
| 4,442,745 | 4/1984 | Gross et al. | 84/1.01 |
| 4,607,300 | 8/1986 | Aoyagi et al. | 360/74.1 |
| 4,881,248 | 11/1989 | Korechika | 377/17 |
| 5,175,844 | 12/1992 | Fukada et al. | 395/550 |
| 5,187,479 | 2/1993 | Johnson, III et al. | 341/6 |

FOREIGN PATENT DOCUMENTS 0357250  3/1990  European Pat. Off. .

*Primary Examiner*—Alyssa H. Bowler
*Assistant Examiner*—Mehmet Geckil
*Attorney, Agent, or Firm*—J. S. Solakian; J. H. Phillips

[57] ABSTRACT

In order to obtain precise submodel control in a central processing unit, there is provided a subcounter which is controlled to count up from a beginning count as an instruction is executed and to count back down at the same rate to the reference count to obtain an effective delay before processing of the next instruction to be processed during normal program execution is started. Instruction transfer and decoding of the new instruction entering the pipeline is inhibited until the subcounter's most significant bit ("sign bit") changes state. If the subcounter is allowed to count during the entire count up and count down periods, a derated mode of ½ is achieved. To obtain other fractions, the subcounter is controlled to count periodically during one count direction period and to count full time during the other count direction period. In the exemplary embodiment, ¼ and ¾ derating is selectively achieved by the use of a modulo 3 counter which allows the subcounter to count only ⅓ the time in one or the other of the subcounter count up or count down periods.

6 Claims, 4 Drawing Sheets

CENTRAL PROCESSING UNIT INCORPORATION SELECTABLE, PRECISA RATIO, SPEED OF EXECUTION DERATING

FIELD OF THE INVENTION

This invention relates to central processing units for data processing systems and, more particularly, to a method and apparatus for controlling the rate of instruction execution in a central processing unit to effect submodel control.

BACKGROUND OF THE INVENTION

In marketing a family of data processing systems, it is common practice to offer systems with different processing speed capabilities which include central processing units (CPUs) that are essentially the same except for the processing speed rating. It is therefore necessary to provide modifications to the circuitry governing the rate of instruction execution for slowing down the processing speeds of the derated CPUs.

Such modifications may be as simple as providing a slower system clock, but this technique may present problems because of potentially troublesome effects on system components other than the CPU(s). This approach can also cause subtle timing problems in the CPU(s) themselves, particularly in the case of pipelined CPUs such as those typically used in powerful mainframe computer systems.

Thus, those skilled in the art will understand that it would be desirable to effect submodel control in such a manner that reliable system operation is absolutely unaffected and the rate of operation is established at a precise fraction of full speed for the execution of each instruction, even for instructions whose period of execution may be variable.

OBJECTS OF THE INVENTION

It is therefore a broad object of this invention to provide improved method and apparatus for effecting submodel control in a family of central processing units.

It is another object of this invention to provide method and apparatus for effecting submodel control in a family of central processing units employing pipelined processors and in which derating is achieved in such a manner as to introduce no adverse timing effects into either the system as a whole or in the derated processor.

In another aspect, it is an object of this invention to provide method and apparatus for effecting submodel control by achieving a rate of virtual execution for all instructions, including those of variable period, which is a known fraction of full speed.

SUMMARY OF THE INVENTION

Briefly, these and other objects of the invention are achieved by providing a subcounter which is controlled to count up from a beginning count as an instruction is executed and then to count back down at the same rate to an to obtain an effective delay before processing of the next instruction to be processed during normal program execution is started. Instruction transfer and decoding of the new instruction entering the pipeline is inhibited until the subcounter's most significant bit ("sign bit") changes state (from "0" to "1" in the example to reflect a change from positive to negative). If the subcounter is allowed to count during the entire count up and count down periods, a derated mode of ½ is achieved. To obtain other fractions such as ¼ and ¾, the subcounter is controlled to count periodically during one count direction period and to count full time during the other count direction period.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

In the following description, logic races are ignored in the interest of simplicity. Thus, when the positive going leading edge of a clock (CLK) signal causes a state change in a logic element, devices driven by that logic element are deemed driven and switched at the same instant and so on through any series of affected logic devices. In practice, the selective use of multiphase clocks, leading and trailing edges of clock pulses and other techniques are used to resolve logic races, all as well known in the art.

Figure 1:
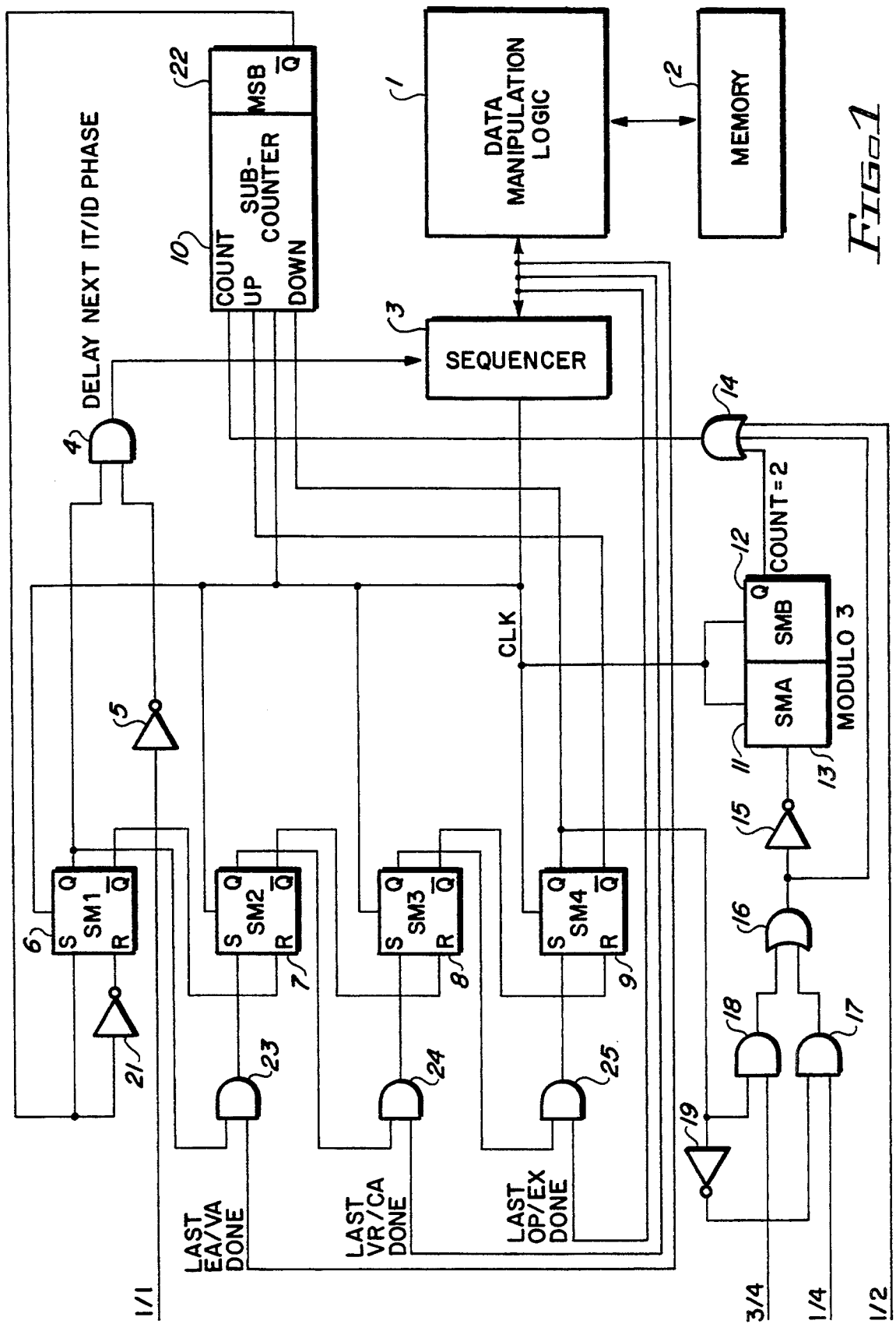
FIG. 1 is a logic diagram of a presently preferred embodiment of the invention shown in its environment of a CPU.

Attention is first directed to FIG. 1 which illustrates a presently preferred embodiment of the invention implemented in positive logic and using simple logic elements. The environment of the invention is within a central processing unit (CPU) which includes data manipulation logic 1 communicating with a memory 2 in the normal fashion. The CPU also includes a sequencer 3 which determines when various operations involved in the execution of instructions take place.

The sequencer also supplies normal, full frequency, clock pulses to the inventive logic on the CLK line. While the invention is applicable to all CPU's, it will be described in the context of a pipelined processor in which certain operations involved in the preparation and execution of sequential instructions are performed in an overlapping manner. Thus, merely by way of example, the sequencer 3 may direct the data manipulation logic 1 to sequentially commence an instruction transfer/instruction decode (IT/ID) phase of a new instruction in the pipe, an effective address/virtual address (EA/VA) phase of the instruction immediately ahead, a virtual-to-real/cache access (VR/CA) phase of an instruction ahead two positions in the pipe and an operand/execution (OP/EX) phase of a instruction at the end of the pipe. (Those skilled in the art will understand that OP/EX might be followed by a short "clean-up" phase to provide a last chance for handling faults, store compare, etc. The clean-up phase is omitted in the following description in the interest of clarity.)

Inputs to the exemplary logic include mutually exclusive 1/1, $\frac{1}{4}$, $\frac{1}{2}$ and $\frac{3}{4}$ signals. In practice, only one of these would be wired up, jumpered or otherwise selected to provide a logic "1" to specify the derating selected. As will become more apparent below, the purpose of the exemplary logic is to supply a "DELAY NEXT IT/ID PHASE" to the sequencer to effect the derating. This signal is present when the output of AND-gate 4 is a logic "1". If the 1/1 (i.e., no derating) speed has been selected, the 1/1 input is inverted to logic "0" by inverter 5 which drives one leg of AND-gate 4 which is therefore permanently disabled and cannot issue the "DELAY NEXT IT/ID PHASE" signal. Thus, the CPU runs at full speed.

In the exemplary embodiment, a series of four cascaded Sub Model flipflops, SM1 6, SM2 7, SM3 8 and SM4 9, are employed. An up/down subcounter 10 provides certain essential control over the flipflop cascade as will become apparent. In some modes of operation, a modulo 3 counter 13, consisting of stages SMA 11 and SMB 12, is utilized. It will be understood that suitable conventional interconnection between SMA and SMB results in modulo 3 operation such that the count sequence is 00, 10, 01, 00, etc.

The modulo 3 couunter 13 is enabled or disabled to count by a logic network driven by SM4 9 and the $\frac{1}{4}$ and $\frac{3}{4}$ inputs. The Q output of SMB, representing a count of 01 ($2_{10}$) when SMB is set, is applied to an OR-gate 14 which drives a "count" input to the subcounter 10. Thus, subcounter 10 can only count when the OR-gate 14 is enabled, i.e., when the modulo counter 13 holds a count of 2.

The input logic network to the modulo 3 counter 13 includes an inverter 15 which is driven by an OR-gate 16 and which selectively enables the modulo 3 counter to count. The junction between the OR-gate 16 and the inverter 15 is connected to another input to OR-gate 14 such that, when that point is at logic "1", the modulo 3 counter is bypassed. The OR-gate 16 has two inputs driven respectively by AND-gate 17 and AND-gate 18. One leg of AND-gate 17 is connected to the $\frac{1}{4}$ signal, and the other leg is driven by inverter 19 which, in turn, is driven by the Q output from SM4 9. Similarly, one leg of AND-gate 18 is connected to the $\frac{3}{4}$ signal, and the other leg is driven directly by the Q output from SM4 9.

The subcounter 10, in addition to receiving CLK pulses and the "count" input from the OR-gate 14, has "up" and "down" inputs to control the direction of count during counting. SM4 9 controls the direction of count, its Q output being connected to the "down" input of subcounter 10 and its Q-bar output being connected to the "up" input. Thus, the subcounter counts up when SM4 is reset and counts down when SM4 is set.

In the example, the flipflops 6, 7, 8, 9 are implemented as simple clocked set/reset types. The set input to SM1 6 is driven by the Q-bar output from the most significant bit (MSB) stage 22 of subcounter 10, and its reset input is driven by inverter 21. Therefore, SM1 always follows the state of the MSB stage 22 of subcounter 10.

The set input to SM2 7 is driven by AND-gate 23 which has one leg connected to the Q output of SM1 6; the other leg is driven from the conventional "LAST EA/VA DONE" signal from the interaction between the data manipulation logic 1 and the sequencer 3. The reset input to SM2 7 is connected to the Q-bar output of SM1 6. Similarly, the set input to SM3 8 is driven by AND-gate 24 which has one leg connected to the Q output of SM2 7; the other leg is driven by the conventional "LAST VR/CA DONE" signal. The reset input to SM3 8 is connected to the Q-bar output of SM2 7. Finally, the set input to SM4 9 is driven by AND-gate 25 which has one leg connected to the Q output of SM3 8; the other leg is driven by the conventional "LAST OP/EX DONE" signal. The reset input to SM4 9 is connected to the Q-bar output of SM3 8.

The first derating mode to be described is $\frac{1}{2}$. If the $\frac{1}{2}$ signal is present to the exclusion of 1/1, $\frac{1}{4}$ and $\frac{3}{4}$, the OR-gate 14 is permanently enabled, and the leg of AND-gate 4 driven by the inverter 5 is permanently at logic "1". In this mode, the modulo 3 counter 13 counts, but has no effect since OR-gate 14 is permanently enabled. Further, the fact that OR-gate is permanently enabled also enables the subcounter 10 to count continuously.

Figure 2:
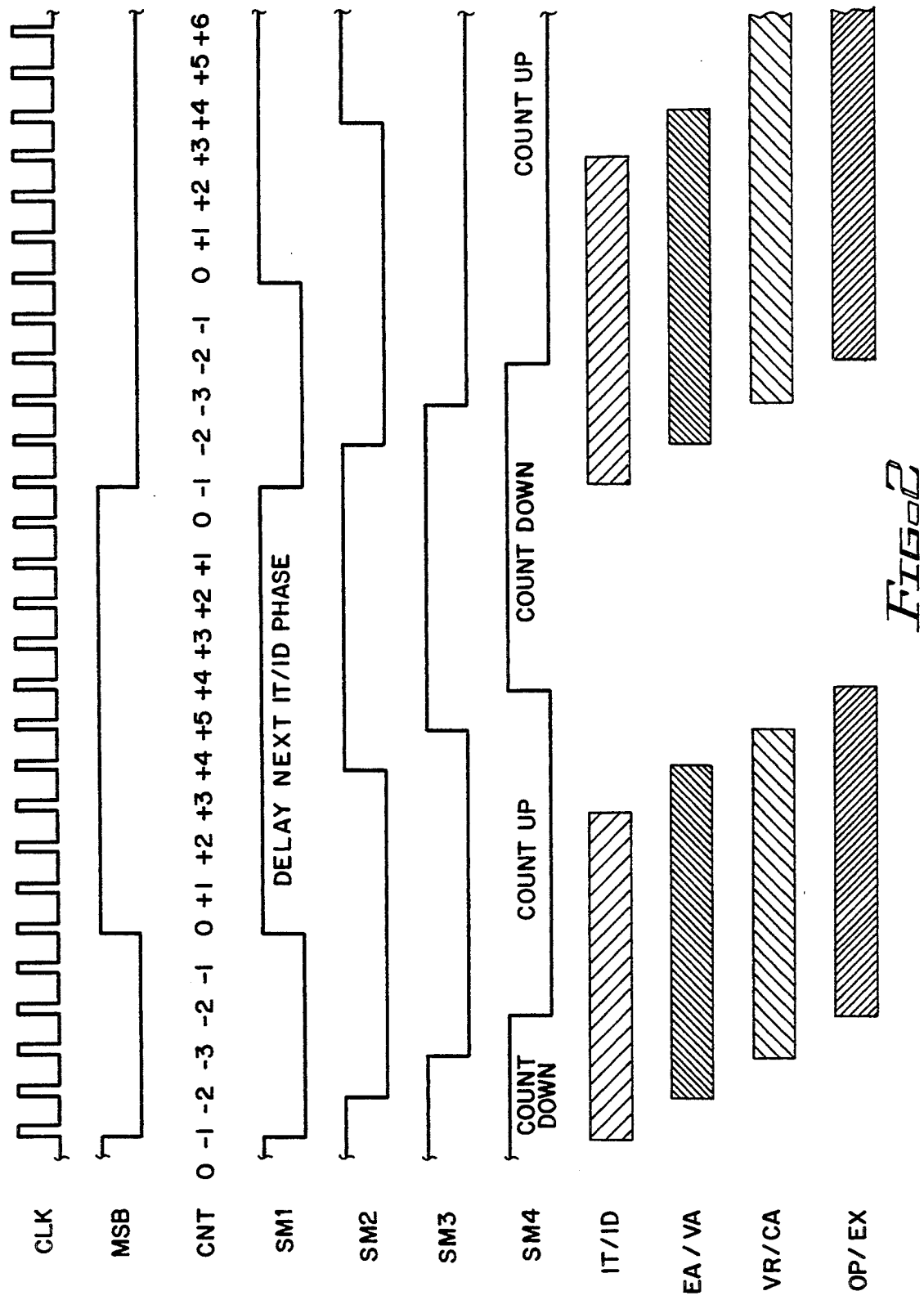
FIG. 2 is a waveform diagram illustrating the operation of the invention when the exemplary derating fraction ½ has been selected.

Referring to FIG. 2 as well as FIG. 1, a beginning point for analysis of the operation can be assumed in which the subcounter 10 is counting down and the MSB 22 has just changed from a logic "0" to a logic "1" to indicate that the subcounter now contains a negative number. In practice, the exemplary subcounter will then be at a reference count which is the largest negative number it can contain; i.e., all logic "1"s. The flipflop SM1 6 is reset at that instant, and the IT/ID phase for a new instruction entering the pipe instruction is allowed to commence. The flipflops SM2 7, SM3 8 and SM4 9 will be successively reset by the next three clock pulses.

The subcounter 10 will continue to count down until SM4 is reset (Q-bar="1") whereupon the subcounter 10 will reverse and begin to count up from a count of −3. As soon as the MSB 22 of the subcounter 10 goes positive ("0"), which will be on the next clock pulse after the subcounter contains all "1"s SM1 is set. This causes its Q output to go to "1" and thus fully enables the AND-gate 4 which issues the "DELAY NEXT IT/ID PHASE" signal to the sequencer 3. The Q output also partially enables the AND-gate 23.

In the meantime, in a cascading manner, the EA/VA phase will have commenced, and when the last EA/VA task has been completed, the "LAST EA/VA DONE" signal will fully enable the AND-gate 23 to set SM2 such that its Q output will partially enable the AND-gate 24. The VR/CA phase will have commenced, and when the last VR/CA task has been completed, the "LAST VR/CA DONE" signal will fully enable AND-gate 24 to set SM3 such that its Q output will partially enable the AND-gate 25. The OP/EX phase will have commenced, and when the last OP/EX task has been completed, the "LAST OP/EX DONE" signal will fully enable AND-gate 25 to set SM4 such that its Q output will switch to a "1" and its Q-bar to a "0".

When SM4 is set, the subcounter 10 will have incremented to some terminal count, +5 in the example, which (taking into account the up and down counting activity of the subcounter) is directly related to the actual time, no matter how variable, it has taken to execute the completing instruction. (It will be understood that the length of the subcounter 10 is selected to be sufficiently large that it will never fill completely when counting up. For example, a 16-bit counter was found to be appropriate in the actual implementation of the invention to handle even the most extended floating point and/or virtual address instructions.) At this instant, the subcounter 10 begins to count back down, the "DELAY NEXT IT/ID PHASE" signal all the while inhibiting the sequencer 3 from starting the IT/ID phase of the next instruction which is to be processed during normal program execution. When the subcounter 10 has decremented all the-way-back to $-1$, as sensed by the MSB 22 going to "1" to place its Q-bar output at "0", the inverter 21 is enabled to reset SM1.

The result is that the count down activity of the subcounter 10 during the time that SM4 is set takes the same length of time as that needed to execute the just completed instruction. It will therefore be understood that, when the three clock periods "leading into" the OP/EX phase are taken into account, $\frac{1}{2}$ submodel performance is obtained without the least disturbance to the internal clock of the CPU or changing any switching times or other timing processes or parameters.

In FIG. 2, the phases of the phases of the four instructions in the pipe are shown to take about the same respective time periods to complete. This is to illustrate execution of a very simple instruction. As a practical matter, they will typically be different, and some of the phases, particularly OP/EX, may be very extended as represented by the succeeding pipeline state shown in FIG. 2. However, the subject submodel control method and apparatus handles this variability readily. The subcounter 10 simply counts up as an instruction is executed and counts down at the same rate to obtain the same time period.

Figure 3:
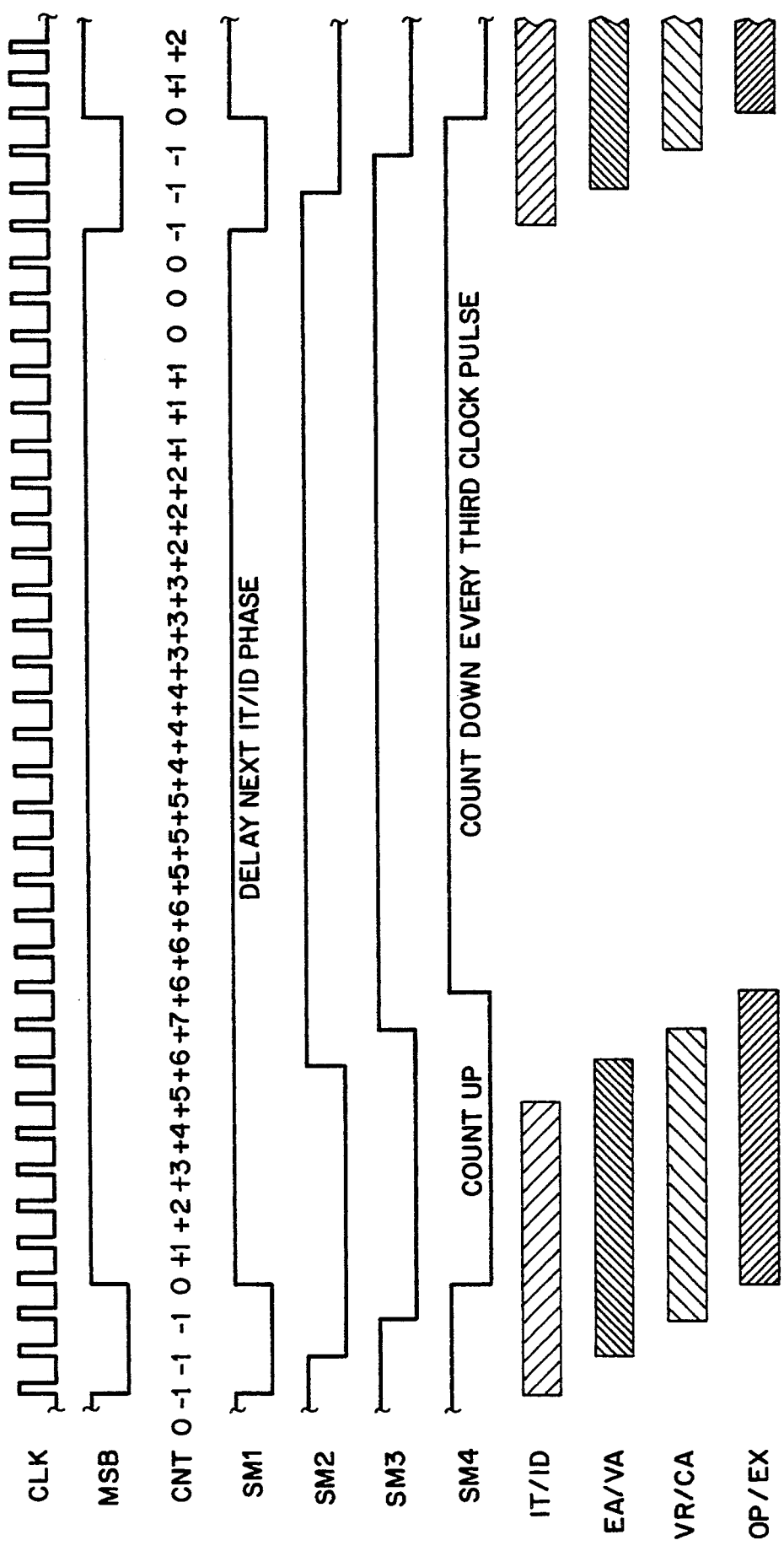
FIG. 3 is a waveform diagram illustrating the operation of the invention when the exemplary derating fraction ¼ has been selected.

Obtaining $\frac{1}{4}$ and $\frac{3}{4}$ submodel control brings into operation the modulo 3 counter 13. Consider the same starting conditions as previously described except that, with reference to FIG. 3 as well as FIG. 1, the $\frac{1}{4}$ signal is present to the exclusion of 1/1, $\frac{1}{2}$ and $\frac{3}{4}$. When SM4 9 is reset on the third clock pulse after SM1 has been reset, its Q output is inverted through inverter 19 to fully enable AND-gate 17 which fully enables OR-gate 16. Under these conditions, OR-gate 14 is enabled, and the modulo 3 counter 13, which is disabled in any event by the inverter 15, has no effect. As a result, the subcounter 10 counts up in the manner previously described until the successive events cause SM4 to become set. This event disables AND-gate 17, OR-gate 16 and OR-gate 14, but inverter 15 enables the modulo 3 counter 13 to count. Since the Q output of SMB 12 drives another input leg to OR-gate 14, the subcounter 10 will be allowed to count only when the count in the modulo 3 counter 13 is $2_{10}$ (01); thus, the subcounter 10 counts down only $\frac{1}{3}$ of the time and it takes three times as long for it to count back down to the beginning count as it took to count up. This condition obtains precise $\frac{1}{4}$ submodel performance. It will be noted that the assumption was made that the modulo 3 counter 13 held a $2_{10}$ when SM4 reset. However, the starting count of the modulo 3 counter is statistically irrelevant, particularly considering that the OP/EX phase is often substantially extended in comparison to the other phases.

Figure 4:
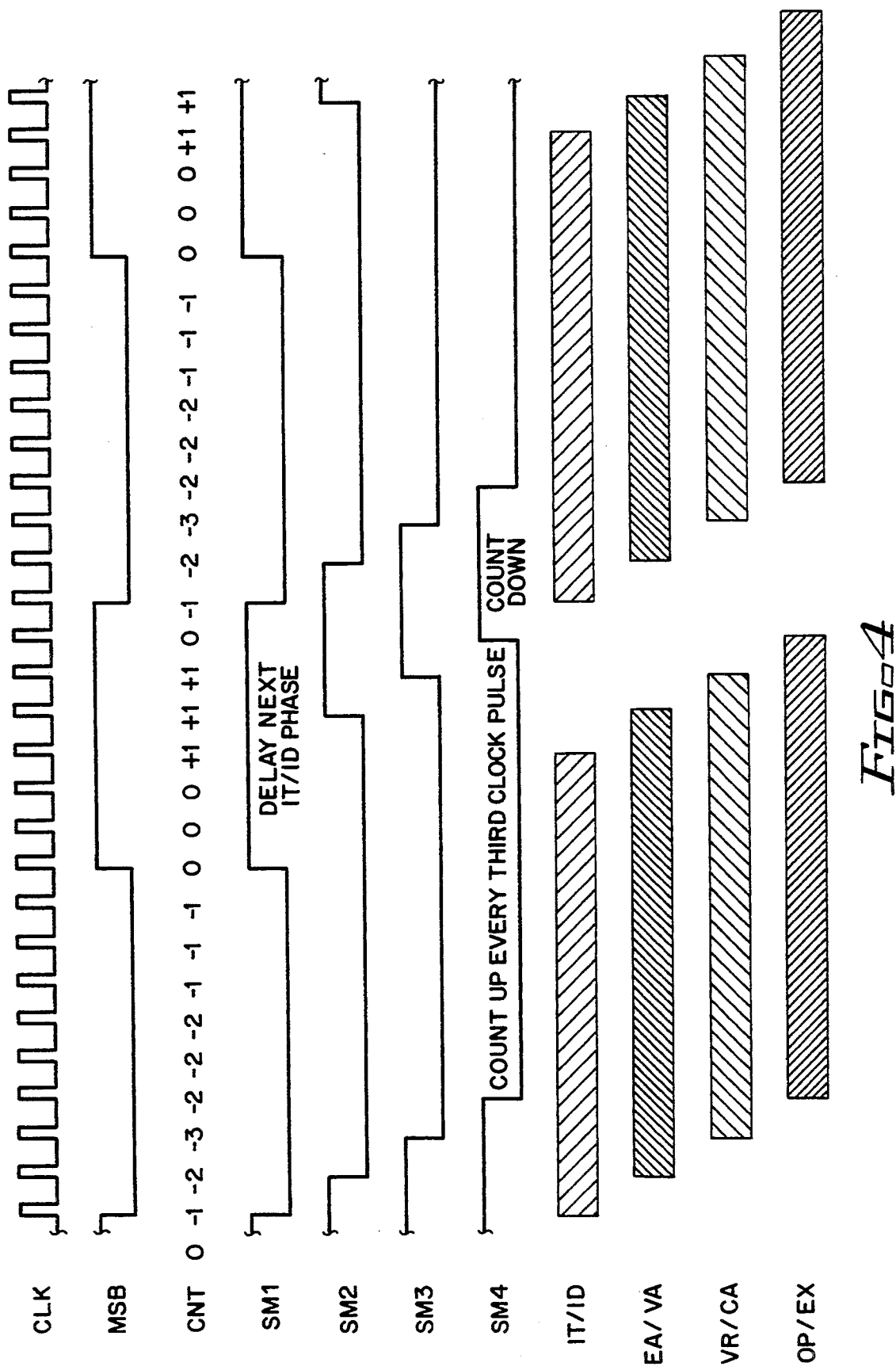
FIG. 4 is a waveform diagram illustrating the operation of the invention when the exemplary derating fraction ¾ has been selected.

Consider now $\frac{3}{4}$ submodel operation while referring to FIG. 4 as well as FIG. 1. When SM4 is reset as previously described, its Q output holds AND-gate 18 disabled such that OR-gate 16 is disabled and OR-gate 14 is not enabled by OR-gate 16. However, the inverter 15 enables the modulo 3 counter 13 to count such that every third count enables the OR-gate 14. It will therefore be seen that the subcounter 10 is allowed to count up $\frac{1}{3}$ of the time; i.e., every third clock pulse. When SM4 becomes set at the end of instruction execution, its Q output fully enables AND-gate 18 which enables OR-gate 16 which, in turn, enables OR-gate 14. As a result, the subcounter 10 counts down full time and reaches the beginning count three times as quickly as it took to execute the instruction. This obtains precise $\frac{3}{4}$ submodel operation. Again, the illustrative assumption was made that the modulo 3 counter 13 held a $2_{10}$ when SM4 reset.

The 1/1, $\frac{1}{2}$, $\frac{3}{4}$, $\frac{1}{4}$ embodiment has been chosen for purposes of illustration because it is one likely to be used in practice. However, those skilled in the art will understand that other submodel performance fractions can be easily obtained by suitable modifying the counter 13 to another modulo and adjusting its input logic.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a central processing unit including data manipulation logic, apparatus for effecting submodel control which includes:

A) sequence control means adapted to direct sequential phases of instruction execution within the data manipulation logic and for sensing when each phase during instruction execution has been completed and issuing signals reflective thereof;

B) an up/down subcounter including count direction and control inputs and a sign bit stage having an output reflecting the state thereof; and C) up/down subcounter control means including:
1) a plurality of cascaded submodel flipflops including at least a first and a last submodel flipflop, each said submodel flipflop having at least one input to establish the state thereof and at least one output to indicate the current state thereof, each said at least one output of said submodel flipflops, except said at least one output of said last submodel flipflop, being coupled to an input of a succeeding submodel flipflop in said cascade;
2) means coupling said at least one output of said last submodel flipflop to said up/down subcounter direction input to selectively initiate counting thereof in a first direction determined by the current state of said last submodel flipflop;
3) means coupling a signal from said sequence control means indicative of the completion of a predetermined phase of instruction execution to said at least one input of said last submodel flipflop if said submodel flipflop immediately prior in said cascade to said last flipflop is currently in a first predetermined state to change the state of said last submodel flipflop to thereby cause said up/down subcounter to count in a second direction;
4) means coupling said output of said sign bit stage of said up/down subcounter to said at least one input of said first submodel flipflop such that said first submodel flipflop reflects the state of said sign bit stage of said up/down subcounter;
5) means coupled to said at least one output of said first submodel flipflop for:
   a) issuing a signal to said sequence control means to delay instituting processing of the next instruction to be processed dining normal program execution when said up/down subcounter is counting in said first direction; and b) issuing a signal to said sequence control means to permit instituting processing of the first phase of the next instruction to be processed during normal program execution when the state of said first submodel flipflop changes sign;

whereby, said up/down subcounter is controlled to count in a first direction from a beginning count as an instruction is executed and then reverse when the instruction completes and count in a second direction until said up/down subcounter changes sign to obtain an effective delay before processing of the succeeding instruction is permitted to proceed.

2. The central processing unit of claim 1 in which the up and down count rates of said up/down subcounter are identical such that the execution rate of said central processing unit is substantially half that which would be achieved if said submodel control apparatus were disabled.

3. The central processing unit of claim 1 in which said up/down subcounter includes a count enablement input and said up/down subcounter control means further includes count rate control means coupled to said at least one output of said last submodel flipflop and adapted to selectively supply count enable signals to said count enablement input to thereby control said up/down subcounter to count up at a predetermined fraction of the rate at which said up/down subcounter is controlled to count down such that the execution rate of said central processing unit is more than half, but less than equal to, that which would be achieved if said submodel control apparatus were disabled.

4. The central processing unit of claim 3 in which said count rate control means further includes:
A) a modulo n counter having a count input and an output indicating the current count therein; and
B) modulo n counter control means for allowing said up/down subcounter to count in said first direction only when said modulo n counter contains a predetermined count, said modulo n counter control means comprising:
1) means coupled intermediate said last submodel flipflop and said count input to said modulo n counter and responsive to a first state of said last submodel flipflop and the presence of a derating select signal to supply a count signal to said count input of said modulo n counter; and
2) means coupled intermediate said modulo n counter output and said count enablement input of said up/down subcounter to selectively enable said up/down subcounter to count in said first direction.

5. The central processing unit of claim 1 in which said up/down subcounter includes a count enablement input and said up/down subcounter control means further includes count rate control means coupled to said at least one output of said last submodel flipflop and adapted to selectively supply count enable signals to said count enablement input to thereby control said up/down subcounter to count down at a predetermined fraction of the rate at which said up/down subcounter is controlled to count up such that the execution rate of said central processing unit is less than half that which would be achieved if said submodel control apparatus were disabled.

6. The central processing unit of claim 5 in which said count rate control means further includes:
A) a modulo n counter having a count input and an output indicating the current count therein; and
B) modulo n counter control means for allowing said up/down subcounter to count in said first direction only when said modulo n counter contains a predetermined count, said modulo n counter control means comprising:
1) means coupled intermediate said last submodel flipflop and said count input to said modulo n counter and responsive to a second state of said last submodel flipflop and the presence of a derating select signal to supply a count signal to said count input of said modulo n counter; and
2) means coupled intermediate said modulo n counter output and said count enablement input of said up/down subcounter to selectively enable said up/down subcounter to count in said second direction.

* * * * *